United States Patent
Tanaka et al.

(10) Patent No.: US 12,534,649 B2
(45) Date of Patent: Jan. 27, 2026

(54) RADIATION-CURABLE ORGANOPOLYSILOXANE COMPOSITION AND A RELEASE SHEET

(71) Applicant: Shin-Etsu Chemical Co., Ltd., Tokyo (JP)

(72) Inventors: Kenji Tanaka, Annaka (JP); Shunji Aoki, Annaka (JP); Ataru Kobayashi, Annaka (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 1093 days.

(21) Appl. No.: 17/609,455

(22) PCT Filed: May 8, 2020

(86) PCT No.: PCT/JP2020/018673
§ 371 (c)(1),
(2) Date: Nov. 8, 2021

(87) PCT Pub. No.: WO2020/230723
PCT Pub. Date: Nov. 19, 2020

(65) Prior Publication Data
US 2022/0228038 A1    Jul. 21, 2022

(30) Foreign Application Priority Data
May 10, 2019   (JP) ................. 2019-089745

(51) Int. Cl.
C09J 7/40 (2018.01)
C08G 77/42 (2006.01)
C08L 83/04 (2006.01)

(52) U.S. Cl.
CPC .............. C09J 7/401 (2018.01); C08G 77/42 (2013.01); C08L 83/04 (2013.01); *C09J 2483/005* (2013.01)

(58) Field of Classification Search
CPC ........... C09J 7/401; C08G 77/42; C08L 83/10
See application file for complete search history.

(56) References Cited

U.S. PATENT DOCUMENTS

| | | | |
|---|---|---|---|
| 4,908,274 A | 3/1990 | Jachmann et al. | |
| 4,978,726 A * | 12/1990 | Dohler | C08G 77/38 528/26 |
| 5,391,405 A | 2/1995 | Irifune et al. | |
| 6,211,322 B1 * | 4/2001 | Dohler | C08G 77/38 528/33 |
| 6,268,404 B1 | 7/2001 | Doehler et al. | |
| 6,548,568 B1 | 4/2003 | Pinto et al. | |
| 2017/0369619 A1 * | 12/2017 | Doehler | C08F 283/12 |

FOREIGN PATENT DOCUMENTS

| | | |
|---|---|---|
| JP | H04239526 A | 8/1992 |
| JP | H0583570 A | 4/1993 |
| JP | H078908 A | 1/1995 |
| JP | 2669947 B2 | 10/1997 |
| JP | H1135895 A | 2/1999 |
| JP | 2002194249 A | 7/2002 |
| JP | 2007066352 A | 3/2007 |
| JP | 2014043547 A | 3/2014 |

OTHER PUBLICATIONS

Sert et al., Chemical Engineering and Processing 81 (2014) 41-47.*
Yan et al., Separation and Purification Technology 286 (2022) 120415.*
Extended European Search Report corresponding to European Patent Application No. 20806568.0 (7 pages) (dated Jan. 5, 2023).
English translation of International Search Report corresponding to International Patent Application No. PCT/JP2020/018673 (2 pages) (mailed Jul. 14, 2020).

* cited by examiner

*Primary Examiner* — Vu A Nguyen
(74) *Attorney, Agent, or Firm* — Myers Bigel, P.A.

(57) ABSTRACT

A radiation-curable organopolysiloxane composition comprising the components (A), (B) and (C): (A) organopolysiloxane represented by the formula (1), wherein at least one of $R^1$ is a (meth)acryloyl group-containing organic group, a is an integer of 2 or more, a, b, c and d satisfy an equation, $2 \leq a+b+c+d \leq 1,000$, and a ratio of the total number of the hydroxyl group and the hydroxyl group-containing organic group to the total number of the (meth)acryloyl group-containing organic group, the hydroxyl group and the hydroxyl group-containing organic group is 0.4 or less; (B) compound having two or more acrylic groups in one molecule in an amount of 0.1 to 50 parts by mass, relative to 100 parts by mass of component (A); and (C) radical polymerization initiator in an amount of 0.1 to 15 parts by mass, relative to 100 parts by mass of component (A).

15 Claims, No Drawings

RADIATION-CURABLE ORGANOPOLYSILOXANE COMPOSITION AND A RELEASE SHEET

TECHNICAL FIELD

The present invention relates to a radiation-curable organopolysiloxane composition which is excellent in radiation curability and a release sheet having light-release and excellent adhesion to a substrate.

BACKGROUND OF THE INVENTION

Release sheets, such as a release paper and a release film, having adhesiveness and releasability from an adhesive material are prepared by applying an organopolysiloxane composition to the surface of a substrate such as paper, laminate paper, synthetic film, transparent resin, or metal foil, followed by cross-linking to form a cured coating.

There are various methods for curing a polyorganosiloxane composition and known are a condensation reaction by an organometal compound, a sulfurization with an organic peroxide, a hydrosilylation reaction by a platinum metal catalyst. However, the aforesaid curing methods need heating, so that curing at a lower temperature or at room temperature is desired for productivity improvement or energy saving. Recently, a substrate having poor heat resistance, such as polyethylene terephthalate (PET) film, is increasingly being used for electronic elements or optical elements.

A radiation-curing method is attracting attention as a manner of generating curing energy without heating. Examples of the radiation-curing method include a radical polymerization of a (meth)acrylic-modified polysiloxane, a cationic polymerization by the ring-opening of the epoxy group of an epoxy-modified polysiloxane, and curing by an ene-thiol reaction of a mercapto-modified polyorganosiloxane with an alkenyl-modified polyorganosiloxane.

Among them, the radical polymerization of a (meth) acrylic-modified polysiloxane has an advantage such that it achieves very good curability and provides a cured product having good adhesion to a substrate, though it needs an apparatus for reducing an oxygen concentration to avoid interfering with curing by oxygen. The radical polymerization offers developments of new applications such as a back-surface treatment agent for adhesive tapes, and a release paper, a release film or tape for adhesive labels, in which a film which is less heat resistant so as to shrink by heating is used as a substrate. Thus, these applications are expected to grow in future.

Many inventions are proposed for release agents comprising a (meth)acryloyl group-containing radical-polymerizable organopolysiloxane, but they have some problems. For example, Japanese Examined Patent Publication No. Hei 5-83570 (Patent Literature 1) describes a method of synthesizing a (meth)acryloyl group-containing radical-polymerizable organopolysiloxane by reacting an epoxy group-containing polyorganosiloxane with a mixture of a (meth) acrylic anhydride and a (meth)acrylic acid.

The (meth)acryloyl group-containing radical-polymerizable organopolysiloxane obtained by the method described in Patent Literature 1 comprises many hydroxyl groups and, thereby, the (meth)acryloyl group-containing radical-polymerizable organopolysiloxane does not have satisfactory releasability from an adhesive substance. Although a cured product obtained from the organopolysiloxane has desirable adhesion to a support such as matte paper or biaxially stretched polypropylene film (OPP), Patent Literature 1 refers neither to adhesion to a PET film nor a test for the long-term adhesion under wet and heat conditions, which is a recent requirement.

Japanese Patent No. 2669947 (Patent Literature 2) describes a radiation-curable organopolysiloxane comprising a (meth)acryloyl group-containing radical-polymerizable organopolysiloxane which has a silsesquioxane unit in the molecule. Patent Literature 2 describes that the radiation-curable organopolysiloxane provides a cured product having light-release and the release force does not change over time. However, Patent Literature 2 does not refer to releasability from a strong adhesive or adhesion to a PET film.

U.S. Pat. No. 6,268,404B1 (Patent Literature 3) describes a radiation-curable organopolysiloxane comprising a mixture of a polyorganosiloxane having many (meth)acryloyl groups in the side chains and a polyorganosiloxane having a (meth)acryloyl group only at the terminal. Patent Literature 3 describes that the polyorganosiloxane having many (meth)acryloyl groups in the side chains is localized in the substrate side of the cured film and the polyorganosiloxane having a (meth)acryloyl group only at the terminal is localized in the surface of the cured film and, thereby, a cured film having good release properties and adhesion to a substrate is obtained. However, Patent Literature 3 does not refer to details of the adhesion to the substrate.

U.S. Pat. No. 6,548,568B1 (Patent Literature 4) describes a composition comprising a polyorganosiloxane having some hydroxyl groups and many (meth)acryloyl groups in the side chains, a polyorganosiloxane having a few hydroxyl groups and some (meth)acryloyl groups at both terminals or in the side chains, and a monomer having an acrylate or vinyl ether group. Patent Literature 4 describes that the composition comprising on account of the polyorganosiloxane having few hydroxyl groups and (meth)acryloyl groups at both terminals or side chains for light-release and the monomer having an acrylate or vinyl ether group for adhesion improvement, light-release and high adhesion of a cured product are attained. However, Patent Literature 4 does not refer to a test for long-term adhesion under wet and heat conditions.

PRIOR LITERATURES

Patent Literatures

Patent Literature 1: Japanese Examined Patent Publication No. Hei 5-83570
Patent Literature 2: Japanese Patent No. 2669947
Patent Literature 3: U.S. Pat. No. 6,268,404
Patent Literature 4: U.S. Pat. No. 6,548,568

SUMMARY OF THE INVENTION

Problems to be Solved by the Invention

The purpose of the present invention is to provide a radiation-curable organopolysiloxane composition capable of providing a release sheet which is of a light-release type (in other words, which requires a smaller force for releasing from an adhesive layer) and has a higher adhesion to a substrate, compared to a release sheet having a cured product of a conventional composition comprising a (meth) acryloyl group-containing radical-polymerizable organopolysiloxane.

Means for Solving the Problems

The present inventor conducted keen researches to solve the aforesaid problems and have found that when a (meth)

acryloyl group-containing organopolysiloxane has a hydroxyl group-containing organic group, the adhesion after stored under wet and heat conditions is smaller as the number of the hydroxyl group is larger. A reason is not clear, but it is presumed that when the organopolysiloxane has a large amount of hydroxyl group, water in air is likely to be taken up by a cured film, so that a strength of the cured film decreases; or when an organopolysiloxane has a large amount of hydroxyl group, a siloxane bond is cut by the hydroxyl group due to wet and heat conditions, so that a strength of the cured film decreases.

The present inventors aimed to ensure the long-term adhesion after stored under wet and heat conditions by reducing the number of hydroxyl group in the (meth) acryloyl group-containing organopolysiloxane to some amount or less. The present inventor has found that the aforesaid purpose is achieved by limiting the number of the hydroxyl group of the radical-polymerizable organopolysiloxane to a certain amount or less in a radiation-curable organopolysiloxane composition comprising a (meth)acryloyl group-containing radical-polymerizable organopolysiloxane and a polyfunctional acrylate.

That is, the present invention provides a radiation-curable organopolysiloxane composition comprising the following components (A), (B) and (C):

(A) organopolysiloxane represented by the following formula (1):

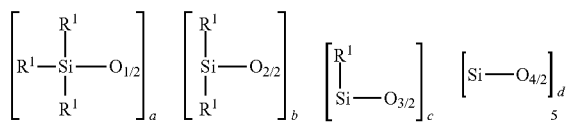

wherein $R^1$ is, independently of each other, a substituted or unsubstituted, monovalent hydrocarbon group having 1 to 10 carbon atoms, an alkoxy group having 1 to 5 carbon atoms, a hydroxyl group, a hydroxyl group-containing organic group, or a (meth)acryloyl group-containing organic group, with at least one of $R^1$ being a (meth)acryloyl group-containing organic group, a is an integer of 2 or more, b is an integer of 0 or more, c is an integer of 0 or more, d is an integer of 0 or more, a, b, c and d satisfy an equation, $2 \leq a+b+c+d \leq 1,000$, and a ratio of the total number of the hydroxyl group and the hydroxyl group-containing organic group to the total number of the (meth)acryloyl group-containing organic group, the hydroxyl group and the hydroxyl group-containing organic group is 0.4 or less;

(B) compound having two or more acrylic groups in one molecule in an amount of 0.1 to 50 parts by mass, relative to 100 parts by mass of component (A); and (C) radical polymerization initiator in an amount of 0.1 to 15 parts by mass, relative to 100 parts by mass of component (A).

Effects of the Invention

The release sheet having a cured layer obtained from the radiation-curable organopolysiloxane composition of the present invention shows light-release (that is, it needs only a smaller force to be released from an adhesive layer) and shows higher adhesion to a substrate, compared to a release sheet obtained from a conventional composition for a release sheet.

The present invention provides the radiation-curable organopolysiloxane composition comprising (A) the aforesaid (meth)acryloyl group-containing organopolysiloxane, (B) polyfunctional acrylic compound, and (C) radical polymerization initiator. As described above, the present radiation-curable organopolysiloxane composition is characterized in that the number of the hydroxyl group of component (A) is controlled. Each component will be described below in detail.

(A) (Meth)Acryloyl Group-Containing Organopolysiloxane

Component (A) is a (meth)acryloyl group-containing organopolysiloxane represented by the following formula (1). The bonding order of the siloxane units in the following square brackets is not limited and may form a block structure or a random structure.

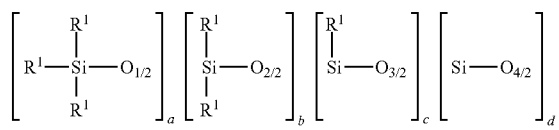

wherein $R^1$ is, independently of each other, a substituted or unsubstituted, monovalent hydrocarbon group having 1 to 10 carbon atoms, an alkoxy group having 1 to 5 carbon atoms, a hydroxyl group, a hydroxyl group-containing organic group, or a (meth)acryloyl group-containing organic group, with at least one of $R^1$ being a (meth)acryloyl group-containing organic group, a is an integer of 2 or more, b is an integer of 0 or more, c is an integer of 0 or more, d is an integer of 0 or more, a, b, c and d satisfy an equation, $2 \leq a+b+c+d \leq 1,000$, and a ratio of the total number of the hydroxyl group and the hydroxyl group-containing organic group to the total number of the (meth)acryloyl group-containing organic group, the hydroxyl group and the hydroxyl group-containing organic group is 0.4 or less.

Component (A) in the present invention is characterized in that the amount of the hydroxyl group is limited to a predetermined amount or less. More specifically, component (A) is characterized in that a ratio of the total number of the hydroxyl group and the hydroxyl group-containing organic group to the total number of the (meth)acryloyl group-containing organic group, the hydroxyl group and the hydroxyl group-containing organic group, each represented by $R^1$ in the aforesaid formula (1), is 0.4 or less, preferably 0.3 mol or less, more preferably 0.25 mol or less. The ratio of the hydroxyl group and the hydroxyl group-containing organic group is preferably smaller, and the lower limit of the ratio is preferably 0.0001 or more, more preferably 0.001 or more, still more preferably 0.01 or more. The ratio of the hydroxyl group and hydroxyl group-containing organic group may be less than 0.001 mol and the composition comprising neither the hydroxyl group nor the hydroxyl group-containing organic group is most preferred. In the present invention, the total number of the hydroxyl group in the (meth)acryloyl group-containing organopolysiloxane is limited as described above, so that a cured product for release sheet, having excellent in long-term adhesion such as adhesion after stored under wet and heat conditions, is obtained. Component (A) in the present invention may be a combination of two or more kinds of the organopolysiloxanes. Even in this case, each of the siloxanes should may satisfy the requisite that a ratio of the total number of the hydroxyl group and the hydroxyl group-containing organic group to the total number of the (meth)acryloyl group, the hydroxyl group and the hydroxyl group-containing organic group, each represented by $R^1$ in the formula (1), be 0.4 or less. It is preferred that the radiation-curable organopolysiloxane composition of the present invention does not contain any organopolysiloxane which is represented by the formula (1) and has a ratio of more than 0.4 of the total number of the hydroxyl group and the hydroxyl group-containing organic group to the total number of the (meth)acryloyl group-containing organic group, the hydroxyl group and the hydroxyl group-containing organic group, each represented by $R^1$ in the formula (1).

The hydroxyl group-containing organic group is a monovalent hydrocarbon group which preferably has a hydroxyl group at its end, has 3 to 20 carbon atoms, more preferably 4 to 15 carbon atoms, and may have an ether bond. The hydroxyl group-containing organic group also includes a group having a (meth)acryloyl group and a hydroxyl group at its end, such as those represented by the following formula (a6) or (a7). The monovalent hydrocarbon group which has an ether bond is preferably have an ethylene oxide and/or propylene oxide structure. Such a hydroxyl group-containing organic group is preferably represented by the following formula (c):

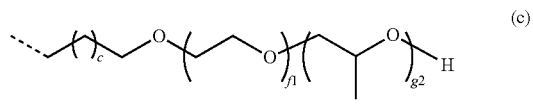

wherein c is an integer of 1 to 5, f1 and f2 are, independently of each other, an integer of 0 or more, and f1+f2 is 0 to 10, preferably 1 to 10, more preferably 1 to 7, still more preferably 1 to 4.

Examples of the group represented by the aforesaid formula (c) include the groups represented by the following formulas (a1) to (a7). Among them, the groups represented by the formulas (a1) to (a5) are preferred.

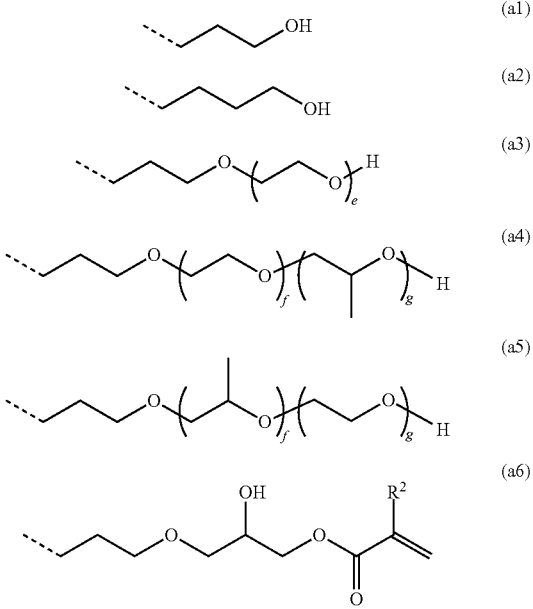

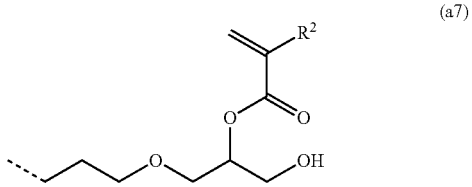

In the aforesaid formulas, $R^2$ is a hydrogen atom or a methyl group, e is an integer of 1 to 10, and f and g are, independently of each other, an integer of 1 to 5. Preferably, e is an integer of 1 to 7 and f and g are, independently of each other, an integer of 1 to 3. More preferably, e is an integer of 1 to 4 and f and g are, independently of each other, 1 or 2. In the aforesaid formulas, the bonding order of the ethylene oxide and propylene oxide in the parentheses is not limited and they may form a block structure or a random structure. In the formulas, the dotted lines show bonds with the silicon atom of the polyorganosiloxane. The composition may contain a compound having both the hydroxyl group-containing organic group and the (meth)acryloyl group, such as those represented by (a6) or (a7), as long as the ratio of the number of the hydroxyl group in the whole composition satisfies the aforesaid range.

In the aforesaid formula (1), a is an integer of 2 or more, b is an integer of 0 or more, c is an integer of 0 or more, d is an integer of 0 or more, and satisfy the equation, $2 \leq a+b+c+d \leq 1,000$. The symbols, a, b, c, and d, may be integers such that the amount of the (meth)acryloyl group and the amount of the hydroxyl group-containing organic group of the (meth)acryloyl group-containing organopolysiloxane satisfies the aforesaid range. The integers a, b, c, and d are preferably $a \geq 2$, $b \geq 10$, $c \geq 0$, and $d \geq 0$, more preferably $a \geq 2$, $b \geq 15$, $c \geq 0$, and $d=0$, and they satisfy the equation, $2 \leq a+b+c+d \leq 1,000$, preferably $2 \leq a+b+c+d \leq 500$.

In the aforesaid formula (1), $R^1$ is, independently of each other, a substituted or unsubstituted monovalent hydrocarbon group having 1 to 10 carbon atoms, an alkoxy group having 1 to 5 carbon atoms, a hydroxyl group, a hydroxyl group-containing organic group, or a (meth)acryloyl group-containing organic group and at least one of $R^1$ is a (meth)acryloyl group-containing organic group. Examples of the substituted or unsubstituted monovalent hydrocarbon group having 1 to 10 carbon atoms include alkyl groups such as a methyl, ethyl, propyl, or butyl group, cycloalkyl groups such as a cyclohexyl group, and aryl groups such as a phenyl or tolyl group; and those hydrocarbon groups wherein a part or all of the hydrogen atoms bonded to a carbon atom of these groups is substituted with a halogen atom such as a fluorine or a chlorine, such as 3,3,3-trifluoropropyl, perfluorobutylethyl and perfluorooctylethyl groups, or is substituted with an alkoxy group such as methoxypropyl and ethoxypropyl groups. Examples of the alkoxy group include a methoxy, ethoxy, isopropoxy and butoxy groups. The organopolysiloxane represented by the aforesaid formula (1) is preferably such that a ratio of the total number of the hydroxyl group and the hydroxyl group-containing organic group to the total number of the (meth)acryloyl group-containing organic group, the hydroxyl group and the hydroxyl group-containing organic group, i.e., all $R^1$, is 0.4 or less, preferably 0.3 or less, more preferably 0.25 or less. The lower limit is not limited and may be less than 0.001. The organopolysiloxane having neither the hydroxyl group nor the hydroxyl group-containing organic group is most preferable. The lower limit may be preferably 0.0001 or more, more preferably 0.001 or more, still more preferably 0.01 or more.

In the aforesaid formula (1), at least two of $R^1$ are a (meth)acryloyl group-containing organic group. A mol percentage of the silicon atoms having the (meth)acryloyl group-containing organic group is preferably 1 to 50 mol %, more preferably 2 to 45 mol %, still more preferably 3 to 40 mol %, based on the total mole of the silicon atoms. If the percentage of the (meth)acryloyl group-containing organic group is less than the aforesaid lower limit, curability of the radiation-curable organopolysiloxane composition may be worse. If the percentage is more than the aforesaid upper limit, a cured product obtained from the radiation-curable organopolysiloxane composition may not have sufficient releasability, which is not preferred.

The (meth)acryloyl group-containing organic group is preferably a monovalent hydrocarbon group which has 3 to 20, preferably 4 to 15, carbon atoms, has at least one (meth)acryloyloxy group in one molecule, and may contain ether bonds. The (meth)acryloyl group-containing organic group is more preferably a group which is represented by the following formula (a) or (b), has one or two (meth)acryloyl groups, and may have a (poly)ethylene oxide and/or (poly)propylene oxide structure.

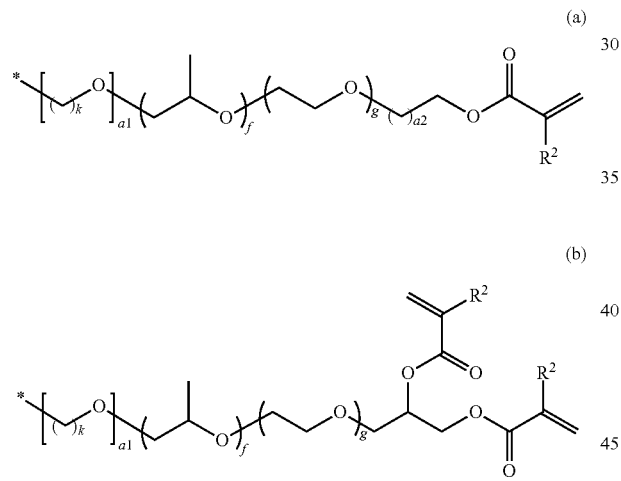

In the aforesaid formulas (a) and (b), $R^2$ is a hydrogen atom or a methyl group; a1 is 0 or 1; a2 is 1 or 2; k is an integer of 1 to 5; f is an integer of 0 to 10, preferably 0 to 5, more preferably 1 to 3, still more preferably 1 or 2; g is an integer of 0 to 10, preferably 0 to 5, more preferably 1 to 3, still more preferably 1 or 2; and f+g is 0 to 10, preferably 1 to 10, more preferably 1 to 7, still more preferably 1 to 4. One or more hydrogen atoms bonded to the carbon atom of the alkylene group may be substituted with a hydroxyl group or a hydroxyl group-containing alkyl group having 1 to 5 carbon atoms. In the aforesaid formulas, the bonding order of the ethylene oxide and the propylene oxide in the parentheses is not limited and they may form a block structure or a random structure.

Examples of the group represented by the aforesaid formula (a) or (b) include groups represented by the following formulas (a6) to (a13). Among these, the groups represented by the following formulas (a8) to (a13) are preferred.

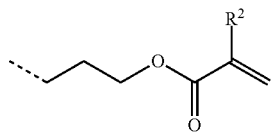
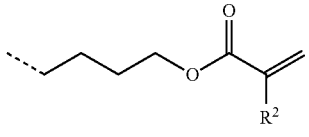
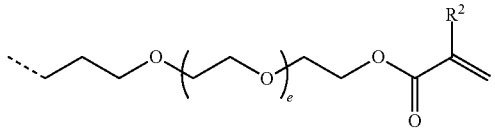
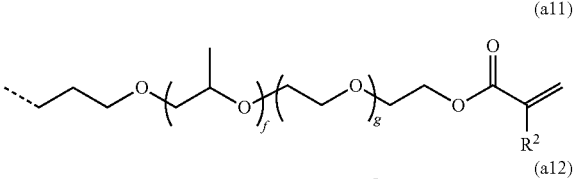
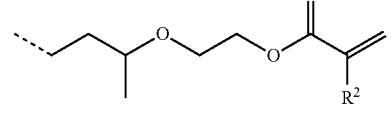
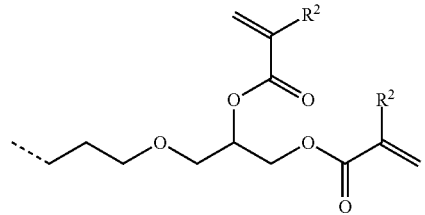
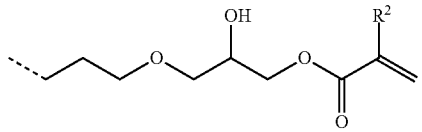
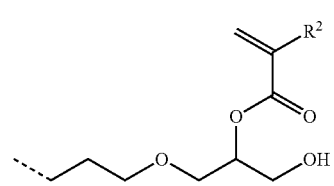

In the aforesaid formulas, $R^2$ is a hydrogen atom or a methyl group, e is an integer of 1 to 10, and f and g are, independently of each other, an integer of 1 to 5. Preferably, e is an integer of 1 to 7 and f and g are, independently of each other, an integer of 1 to 3. More preferably, e is an integer of 1 to 4 and f and g are, independently of each other, 1 or 2. In the aforesaid formulas, the bonding order of the ethylene oxide and the propylene oxide in the parentheses is not limited and they may form a block structure or a random structure. In the formulas, the dotted lines show bonds with the silicon atom of the polyorganosiloxane.

The (meth)acryloyl group-containing organopolysiloxane having the specified number of hydroxyl groups may be obtained by a known method. For example, the (meth)

acryloyl group-containing organopolysiloxane is obtained by an acid equilibration in the presence of an acid catalyst as described in Japanese Patent No. 2669947. Alternatively, the (meth)acryloyl group-containing organopolysiloxane may be obtained by an esterification of a polyorganosiloxane having a hydroxyl group-containing organic group having an ether bond with a (meth)acrylic acid in the presence of an acid catalyst, or a transesterification of a polyorganosiloxane having a hydroxyl group-containing organic group and a (meth)acrylate ester in the presence of a metal catalyst, as described in Japanese Patent No. 3780113. Further, the (meth)acryloyl group-containing organopolysiloxane mat also be obtained by a transesterification of a polyorganosiloxane having a hydroxyl group-containing organic group and a (meth)acrylate ester in the presence of a metal catalyst.

More specifically, in the acid equilibration reaction in the presence of an acid catalyst as described in Japanese Patent No. 2669947, a polyorganosiloxane having a hydroxyl group-containing organic group is not used, or a hydroxyl group content is very small even though a polyorganosiloxane contains the hydroxyl group-containing organic group, so that the ratio of the number of the hydroxyl group-containing organic group to the total number of the (meth)acryloyl group and hydroxyl group-containing organic group may be adjusted to 0.4 or less. In the esterification of a polyorganosiloxane having a hydroxyl group-containing organic group with an ether bond with (meth)acrylic acid in the presence of an acid catalyst as described in Japanese Patent No. 3780113, a ratio of the number of the hydroxyl group-containing organic groups decreases as the esterification proceeds. This means that the number of the hydroxyl group-containing organic group reduces with an increasing amount of the intended (meth)acryloyl group-containing organopolysiloxane produced.

(B) Polyfunctional Acrylic Compound

Component (B) is a polyfunctional acrylic compound and functions as an adhesion-improving component in the radiation-curable organopolysiloxane composition of the present invention. The polyfunctional acrylic compound may be a compound which has a plurality of (meaning, two or more) acrylic groups in one molecule and may be a conventional polyfunctional acrylic compound. Component (B) preferably has 3 or more acrylic groups, more preferably 3 to 20 acrylic groups, still more preferably 3 to 15 acrylic groups, in one molecule. When the present composition comprises a compound having 3 or more acrylic groups in one molecule, a cured product has improved adhesion to a substrate, which is preferred. Examples of the aforesaid polyfunctional acrylic compound include $C_{4-25}$ hydrocarbon groups which have acrylic groups and may have a hetero atom and acrylic group-containing organosilanes or hydrolytic condensation products thereof.

Examples of $C_{4-25}$ hydrocarbon groups which have 2 or more acrylic groups in one molecule and may have a hetero atom include bifunctional acrylic compounds such as 1,4-butanediol diacrylate, 1,6-hexanediol diacrylate, 1,9-nonanediol diacrylate, 1,10-decanediol diacrylate, tricyclodecanedimethanol diacrylate, dipropylene glycol diacrylate, tripropylene glycol diacrylate, 9,9-bis[4-(2-acryloyloxyethoxy)phenyl]fluorene, and Viscoat #700HV (ethoxylated (3.8) bisphenol A diacrylate), ex Osaka Organic Chemical Industry Ltd.; trifunctional acrylic compounds such as trimethylolpropane triacrylate, pentaerythritol triacrylate, tris(2-acryloyloxyethyl) isocyanurate, α,α',α''-propane-1,2,3-triyltris[ω-(acryloyloxy)poly(oxyethylene)], TMPEOTA (trimethylolpropane ethoxy triacrylate), ex Daicel-Allnex Ltd., and OTA 480 (glycerinpropoxy triacrylate), ex Daicel-Allnex Ltd.; and tetra- or higher functional acrylic compounds such as pentaerythritol tetraacrylate, ditrimethylolpropane tetraacrylate, dipentaerythritol hexaacrylate, and tripentaerythritol octaacrylate, and ATM-4E (ethoxylated pentaerythritol tetraacrylate), ATM-4P (propoxylated pentaerythritol tetraacrylate), and A-9550 (dipentaerythritol polyacrylate), ex Shin-Nakamura Chemical Co., Ltd.

The organosilane having 2 or more acrylic groups in one molecule (hereinafter referred to as "polyfunctional acrylic organosilane) is represented, for example, by the following formula (2):

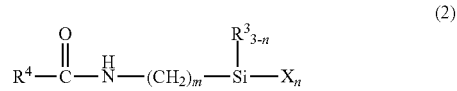

wherein n is an integer of 1 to 3, m is an integer of 1 to 10, X is an alkoxy group having 1 to 4 carbon atoms, $R^3$ is an alkyl group having 1 to 4 carbon atoms, and $R^4$ is a group represented by the following formula (3):

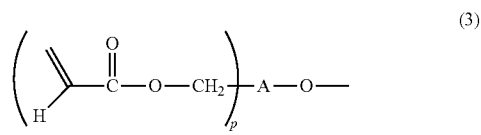

wherein A is a linear, branched, or cyclic, trivalent to hexavalent hydrocarbon group which has 1 to 10 carbon atoms and may have an oxygen atom or a nitrogen atom in the group, but does not contain another hetero atom; and p is an integer of 2 to 5.

The group represented by the aforesaid formula (2) is more preferably a polyfunctional acrylic organosilane represented by the following formulas (4) to (7):

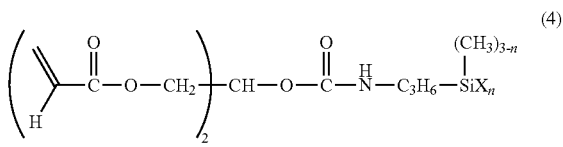

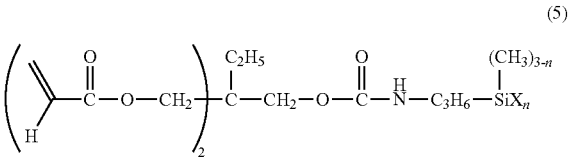

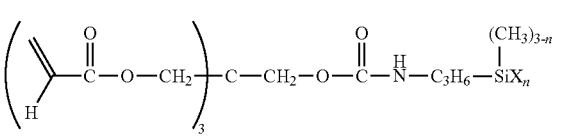

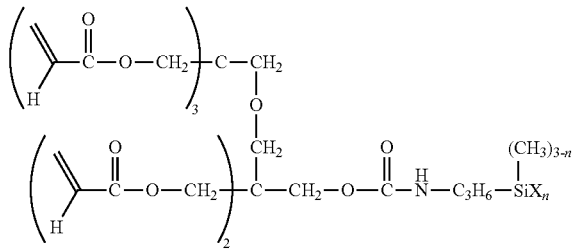

(7)

In the aforesaid formulas, n is 1 to 3.

A method of preparing the polyfunctional acrylic organosilane represented by the aforesaid formula (2) is not particularly limited. For example, the polyfunctional acrylic organosilane may be prepared by the method disclosed in Japanese Patent Application Laid-Open No. 2016-041774. Specifically, a compound having an acrylic group and a hydroxyl group in one molecule are reacted with an isocyanate group-containing organosilane to obtain the polyfunctional acrylic organosilane. Examples of the isocyanate group-containing organosilane include 3-isocyanatopropyltrimethoxysilane, 3-isocyanatopropylmethyldimethoxysilane, 3-isocyanatopropyltriethoxysilane, and 3-isocyanatopropylmethyldiethoxysilane. From the standpoint of easy availability, 3-isocyanatopropyltrimethoxysilane and 3-isocyanatopropyltriethoxysilane are preferred. Examples of the compound having an acrylic group and a hydroxyl group in one molecule include bifunctional acrylic alcohols such as 2-hydroxy-3-acryloyloxypropyl methacrylate and polyfunctional acrylic alcohols such as pentaerythritol triacrylate and dipentaerythritol pentaacrylate.

Catalyst may be used in the preparation of the polyfunctional acrylic organosilane, if necessary. The catalyst may be any catalyst conventional for isocyanates, preferably a tin compound. The amount of the catalyst is 1 to 0.0000001 mol, preferably 0.01 to 0.000001 mol, per mol of the isocyanate group-containing organosilane. If the amount of the catalyst is more than 1 mol, its effect is saturated and is therefore uneconomical. If the amount is less than 0.0000001 mol, a sufficient effect is not attained, so that the reaction rate is slow to give a decreased productivity. In the preparation of the organosilane having a plurality of acrylic groups in one molecule, the reaction is exothermic. Accordingly, if the temperature is too high, side reactions may occur. A preferable reaction temperature in the preparation is 20 to 150° C., more preferably 30 to 130° C., still more preferably 40 to 110° C. If the reaction temperature is lower than 20° C., the reaction rate and productivity may be too low. If the temperature is higher than 150° C., side reactions such as polymerization reaction of the isocyanate-containing organosilane and polymerization of the acrylic group may occur.

Component (B) may be a hydrolytic condensation product of the aforesaid polyfunctional acrylic organosilane. For the hydrolytic condensation of it, any conventional method may be used. Examples of a catalyst for the hydrolytic condensation include acids such as hydrochloric acid, nitric acid, acetic acid, and maleic acid; alkali metal hydroxides such as NaOH and KOH; amine compounds such as ammonia, triethylamine, dibutylamine, hexylamine, and octylamine, and salts of the amine compounds; bases such as quaternary ammonium salts such as benzyltriethylammonium chloride, tetramethylammonium hydroxide, and tetrabutylammonium hydroxide; fluoride salts such as potassium fluoride and sodium fluoride; solid acid catalysts or solid base catalysts (such as ion exchange resin catalysts); organometallic compounds such as metal salts of an organic carboxylic acid such as iron 2-ethylhexoate, titanium naphthalate, zinc stearate, and dibutyltin diacetate, organotitanium esters such as tetrabutoxytitanium and dibutoxy-(bis-2,4-pentanedionato) titanium, organic zirconium esters such as tetrabutoxyzirconium and dibutoxy-(bis-2,4-pentanedionato)zirconium, alkoxyaluminum compounds such as aluminum triisopropoxide, and aluminum chelate compounds such as aluminum acetylacetonate complex; and aminoalkyl-substituted alkoxysilanes such as 3-aminopropyltrimethoxysilane and N-(β-aminoethyl) 3-3-aminopropyltrimethoxysilane. They may be used alone or in combination thereof. The polyfunctional acrylic organosilane may be hydrolyzed and condensed in the presence of the aforesaid hydrolitic condensation catalyst, water, and, if necessary, an organic solvent.

The amount of component (B) is 0.1 to 50 parts by mass, preferably 0.5 to 30 parts by mass, more preferably 1 to 20 parts by mass, relative to 100 parts by mass of component (A). If the amount of component (B) is smaller than the aforesaid lower limit, an adhesion-improving effect is not satisfactory. If the amount is more than the upper limit, the adhesion-improving effect is not attained and, further, releasability lowers.

(C) Radical Polymerization Initiator

Component (C) is a radical polymerization initiator that generates radicals by exposure to radiation. The radical polymerization initiator is not particularly limited as long as it has ability of generating radicals by exposure to radiation. Examples of it include diethoxyacetophenone, 2-hydroxy-2-methyl-1-phenylpropan-1-one, 4'-isopropyl-2-hydroxy-2-methylpropiophenone, 2-hydroxymethyl-2-methylpropiophenone, 2,2-dimethoxy-1,2-diphenylethan-1-one, p-dimethylaminoacetophenone, p-tertiary-butyldichloroacetophenone, p-tertiary-butyltrichloroacetophenone, p-azidobenzalacetophenone, 1-hydroxycyclohexyl phenyl ketone, 2-methyl-1-[4-(methylthio)phenyl]-2-morpholinopropanone-1,2-benzyl-2-dimethylamino-1-(4-morpholinophenyl)-butanone-1, benzoin, benzoin methyl ether, benzoin ethyl ether, benzoin isopropyl ether, benzoin n-butyl ether, benzoin-isobutylether, benzyl, anisyl, benzophenone, methyl o-benzoylbenzoate, Michler's ketone, 4,4'-bis(diethylamino)benzophenone, 4,4'-dichlorobenzophenone, 4-benzoyl-4'-methyldiphenylsulfide, thioxanthone, 2-methylthioxanthone, 2-ethylthioxanthone, 2-chlorothioxanthone, 2-isopropylthioxanthone, 2,4-diethylthioxanthone, bis(cyclopentadienyl)-bis(2,6-difluoro-3-(pyr-1-yl)titanium and 1-(4-(2-hydroxyethoxy)phenyl)-2-hydroxydi-2-methyl-1-propane-1-one. The aforesaid radical polymerization initiators may be used alone or in combination of two or more of them, depending on the desired properties.

The amount of the radical polymerization initiator (C) is 0.1 to 15 parts by mass, preferably 0.5 to 12 parts by mass, more preferably 1 to 10 parts by mass, relative to 100 parts by mass of the aforesaid component (A). If the amount of component (C) is less than the aforesaid lower limit, curability may be worse. If the amount is more than the aforesaid upper limit, curability is not improved, either and, further, releasability may be worse.

The radiation-curable organopolysiloxane composition of the present invention is obtained by mixing the aforesaid components. Besides the aforesaid components (A) to (C), the present composition may further comprise, as an optional component, additives such as silicone resin, polydimethylsiloxane, filler, antistatic agent, flame retardant, antifoaming agent, fluidity modifier, light stabilizer, solvent, non-reactive resin, and radical-polymerizable compound. The amount of the optional component may be selected as needed, referring to the conventional release agent compositions, as long as the effects of the present invention are not detracted.

The radiation-curable organopolysiloxane composition of the present invention is applied to a substrate and then cured by radiation to form a release sheet. The substrate is not particularly limited and may be those generally used for a release sheet. Examples of the substrate include glassine paper, clay coated paper, fine paper, and polyethylene laminated paper; plastic films such as polyester film, polystyrene film, polyethylene film, and polypropylene film; transparent resins such as polycarbonate; and metallic foils such as aluminum foil. The amount of the radiation-curable organopolysiloxane composition to be applied is not particularly limited and may usually be about 0.05 to 3.0 g/m².

Curing by radiation may be conducted by a conventional method. Preferred examples of radiation energy rays include energy rays in the ultraviolet to visible light region (about 100 to about 800 nm) obtained from a high pressure or ultrahigh pressure mercury lamp, a metal halide lamp, a xenon lamp, a carbon arc lamp, a fluorescent lamp, a semiconductor solid laser, an argon laser, a He-Cd laser, a KrF excimer laser, an ArF excimer laser, or an F2 laser. Radiation sources having a strong luminous hardness in a range of 200 to 400 nm are preferred. Further, radiation having high energy such as electron beam and X-ray may be used. The time of irradiation with radiation energy is usually for about 0.1 sec to 10 sec at ambient temperature. However, the transmission of the energy ray is low or the film thickness of the curable composition is large, it is sometimes preferable to take more time for the irradiation. If necessary, after the exposure to energy rays, the composition may be postcured by heating at room temperature to 150° C. for several seconds to several hours.

If necessary, the radiation-curable organopolysiloxane composition of the present invention may be diluted with an organic solvent. The organic solvent is not particularly limited and may be any conventional solvent used for a release agent composition. Examples of the solvent include aromatic hydrocarbon compounds such as toluene and xylene, aliphatic hydrocarbon compounds such as hexane, heptane, octane, and nonane, alcohols such as methanol, ethanol, isopropyl alcohol, and butanol, ester compounds such as ethyl acetate and butyl acetate, and ketone compounds such as acetone and methyl ethyl ketone.

The radiation-curable organopolysiloxane composition of the present invention is curable by radiation even in air, but is preferably cured at a reduced oxygen concentration to improve curability. The curability is improved in a lower oxygen concentration, so that the lower oxygen concentration is preferred. For example, the oxygen concentration is 1 vol %, preferably 0.1 vol %, more preferably 0.01 vol %.

EXAMPLES

The present invention will be explained below in further detail with reference to a series of the Examples and the Comparative Examples, though the present invention is no way limited by these Examples.

The evaluation results in the following table were determined by the following test methods. The viscosity is determined at 25° C. by a BM type rotational viscometer. In the structural formula, Me represents a methyl group and AO represents an acryloyloxy group.

In the Examples, the structure of the (meth)acryloyl group-containing organopolysiloxane was analyzed by $^1$H-NMR and $^{29}$Si-NMR. A ratio of the number of the hydroxyl group-containing organic group to the total number of the (meth)acryloyl group-containing organic group and the hydroxyl group-containing organic group bonded to a silicon atom (the ratio will hereinafter be referred to as "hydroxyl group ratio" in the following Examples and Comparative Examples) was calculated as follows.

For example, in Synthesis Example 3, the numbers of the hydroxyl group-containing organic group and the (meth)acryloyl group-containing organic group determined by the $^1$H-NMR and $^{29}$Si-NMR analyses were 0.1 and 1.9, respectively. Therefore, a ratio of the hydroxyl group-containing organic group to the total number of the (meth)acryloyl group-containing organic group and the hydroxyl group-containing organic group is 0.1/(0.1+1.9)=0.05.

Synthesis Example 1

In a 300-mL three-necked flask equipped with a stirrer and a thermometer, were placed 4.4 g of 1,1,1,3,5,5,5-heptamethyl-3-[(trimethylsilyl)oxy]pentanetrisiloxane, 182.3 g of octamethylcyclotetrasiloxane, 42.3 g of an organopolysiloxane represented by the following formula (8), 0.15 g of 2,6-di-tert-butyl-4-methylphenol, and 0.005 g of N,N'-diphenyl-p-phenylenediamine and stirred at room temperature for 5 minutes. Then, 2.7 g of methanesulfonic acid was added to the mixture and the resulting mixture was heated and stirred at 90° C. for 8 hours. The reaction mixture was cooled to room temperature, to which 7.05 g of sodium bicarbonate was then added and the resulting mixture was heated and stirred at 105° C. for 2 hours. After the reaction mixture was filtered under a pressure, the filtrate was subjected to a distillation under a reduced pressure of 20 mmHg at 115° C. for 6 hours to obtain an acryloyl group-containing organopolysiloxane represented by the following average composition formula (A-1). The viscosity at 25° C. was 400 mPa·s. The hydroxyl group ratio in the acryloyl group-containing organopolysiloxane was less than 0.001.

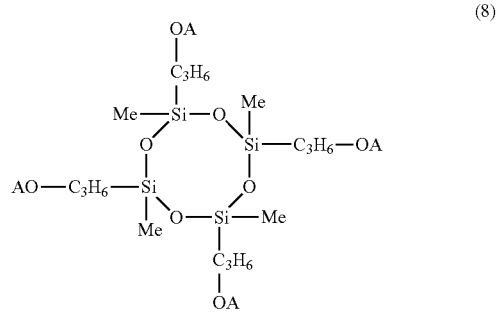

(8)

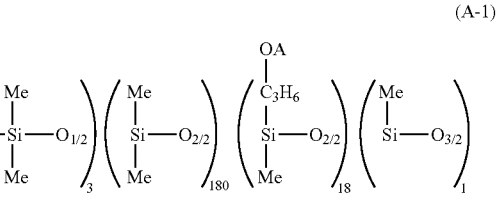

(A-1)

In the aforesaid and following formulas, Me is a methyl group and AO— is an acryloyloxy group. The bonding order of the siloxane units in the parentheses is not limited to the aforesaid one.

Synthesis Example 2

In a 300-mL three-necked flask equipped with a stirrer and a thermometer, were placed 7.4 g of 1,1,1,3,5,5,5-heptamethyl-3-[(trimethylsilyl)oxy]pentanetrisiloxane, 200.7 g of octamethylcyclotetrasiloxane, 24.8 g of the organopolysiloxane represented by the aforesaid formula (8), 0.12 g of 2,6-di-tert-butyl-4-methylphenol, and 0.005 g of N,N'-diphenyl-p-phenylenediamine and stirred at room temperature for 5 minutes. Then, 2.7 g of methanesulfonic acid was added to the mixture and the resulting mixture was heated and stirred at 90° C. for 8 hours. The reaction mixture was cooled to room temperature, to which 7.05 g of sodium bicarbonate was then added and the resulting mixture was heated and stirred at 105° C. for 2 hours. After the reaction mixture was filtered under a pressure, the filtrate was subjected to a distillation under a reduced pressure of 20 mmHg at 115° C. for 6 hours to obtain an acryloyl group-containing organopolysiloxane represented by the following average composition formula (A-2). The viscosity at 25° C. was 180 mPa-s. The hydroxyl group ratio in the acryloyl group-containing organopolysiloxane was less than 0.001.

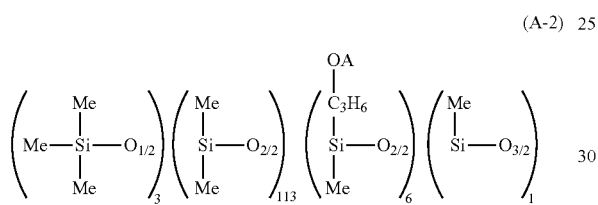

(A-2)

Synthesis Example 3

In a 300-mL three-necked flask equipped with a stirrer, a thermometer, and a Dean-Stark apparatus, were placed 79.70 g of an organopolysiloxane represented by the following formula (9) and having a viscosity at 25° C. of 35 mPa-s, 34.32 g of ethyl acrylate, 4.179 g of zirconium acetyl acetonate, 0.58 g of diethylhydroxyamine, 0.059 g of 2,6-di-tert-butyl-4-methylphenol, and 92.81 g of toluene. The resulting mixture was heated and stirred at 85° C. for 24 hours while removing a byproduct ethanol generated during the reaction. After the reaction mixture was filtered, the filtrate was subjected to a distillation under a reduced pressure of 20 mmHg at 85° C. for 2 hours to obtain an acryloyl group-containing organopolysiloxane represented by the following average composition formula (A-3). The viscosity at 25° C. was 18 mPa-s. The hydroxyl group ratio in the aforesaid acryloyl group-containing organopolysiloxane was 0.05.

Synthesis Example 4

In a 300-mL three-necked flask equipped with a stirrer, a thermometer, and a Dean-Stark apparatus, were placed 110.74 g of an organopolysiloxane represented by the following formula (10) and having a viscosity at 25° C. of 500 mPa-s, 72.40 g of ethyl acrylate, 5.88 g of zirconium acetylacetonate, 0.82 g of diethylhydroxyamine, 0.097 g of 2,6-di-tert-butyl-4-methylphenol, and 18.31 g of toluene. The resulting mixture was heated and stirred at 85° C. for 24 hours while removing a byproduct ethanol generated during the reaction. After the reaction mixture was filtered, the filtrate was subjected to a distillation under a reduced pressure of 20 mmHg at 85° C. for 2 hours to obtain an acryloyl group-containing organopolysiloxane represented by the following average composition formula (A-4). The viscosity at 25° C. was 200 mPa-s. The hydroxyl group ratio in the aforesaid acryloyl group-containing organopolysiloxane was 0.10.

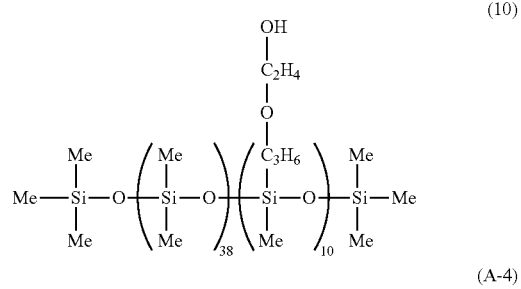

(10)

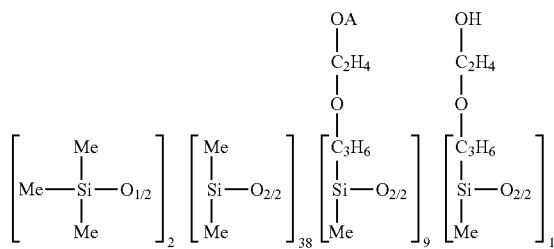

(A-4)

Synthesis Example 5

The procedures of Synthesis Example 4 were repeated, except that 132.34 g of the organopolysiloxane represented by the aforesaid formula (10), 86.53 g of ethyl acrylate, 0.70 g of zirconium acetylacetonate, and 0.10 g of diethylhydroxyamine were used; 0.328 g of 2-tert-butyl-4-methyl-6-(2-hydroxy-3-tert-butyl-5-methylbenzyl)phenyl acrylate

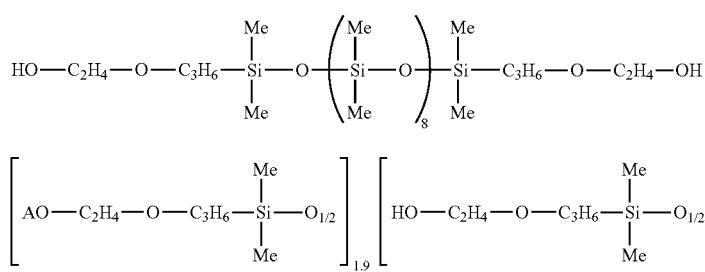

(9)

(A-3)

was used instead of 2,6-di-tert-butyl-4-methylphenol; and toluene was not used, whereby an acryloyl group-containing organopolysiloxane represented by the following average composition formula (A-5) was obtained. The resulting product had a viscosity at 25° C. of 220 mPa·s. The hydroxyl group ratio in the aforesaid acryloyl group-containing organopolysiloxane was 0.20.

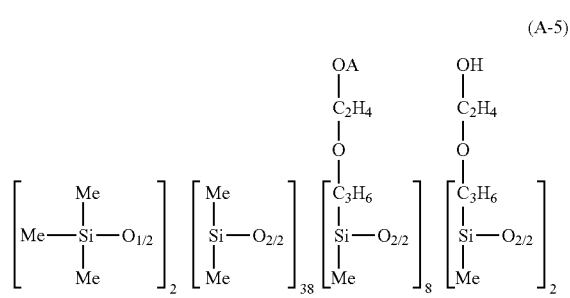

(A-5)

Comparative Synthesis Example 1

The procedures of Synthesis Example 4 were repeated, except that 70.76 g of the organopolysiloxane represented by the aforesaid formula (10) and 45.70 g of ethyl acrylate were used and 1.45 g of paratoluenesulfonic acid monohydrate and 0.060 g of 2,6-d-tert-butyl-4-methylphenol were used instead of zirconium acetylacetonate and diethylhydroxyamine, and 94.80 g of toluene were used, whereby an acryloyl group-containing organopolysiloxane represented by the following average composition formula (D-1) was obtained. The resulting product had a viscosity at 25° C. of 26 mPa·s. The hydroxyl group ratio in the aforesaid acryloyl group-containing organopolysiloxane was 0.45.

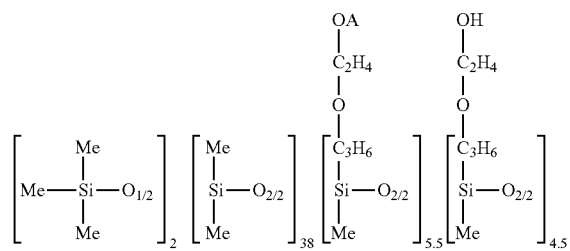

(D-1)

Comparative Synthesis Example 2

In a 300-mL separable flask equipped with a stirrer, a thermometer, a dropping funnel, and a reflux condenser, were placed 80.86 g of an epoxy-modified organopolysiloxane represented by the following formula (11), 0.95 g of 1,4-diazabicyclo[2.2.2]octane, 0.059 of 2,6-di-tert-butyl-4-methylphenol, and 95.40 of toluene and heated to 50° C. When the temperature reached 50° C., a mixture of 36.55 g of acrylic acid and 6.40 g of acrylic anhydride was added dropwise from the dropping funnel. After completion of the dropwise addition, the temperature was elevated and the reaction mixture was heated and stirred at 90 to 100° C. for 40 hours. The reaction mixture was subjected to a distillation under a reduced pressure of 20 mmHg at 120° C. for 3 hours and then filtered to obtain an acryloyl group-containing organopolysiloxane represented by the following average composition formula (D-2). The viscosity at 25° C. was 600 mPa·s. The hydroxyl group ratio in the aforesaid acryloyl group-containing organopolysiloxane was 0.50.

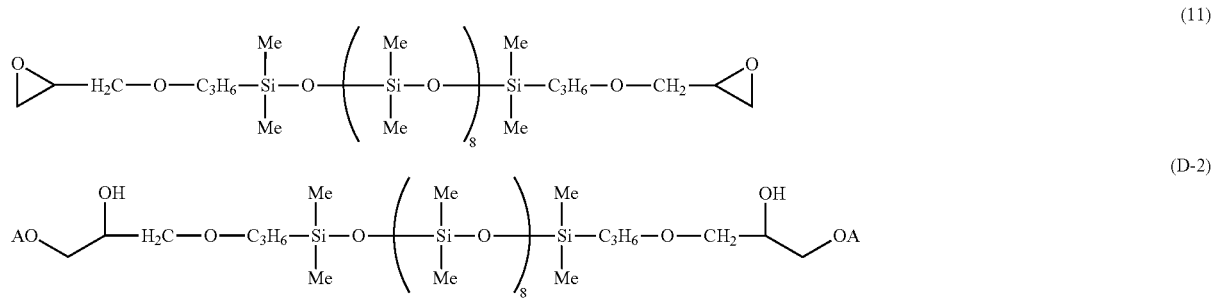

(11)

(D-2)

The components used in the Examples and the Comparative Examples will be described below.

(B) Polyfunctional Acrylate (B-1) Trimethylolpropane triacrylate (ex Shin-Nakamura Chemical Co., Ltd.)

(B-2) Ditrimethylolpropane tetraacrylate (ex Shin-Nakamura Chemical Co., Ltd.)

(B-3) Pentafunctional acrylsilane compound represented by the following formula (ex Shin-Etsu Chemical Co., Ltd.)

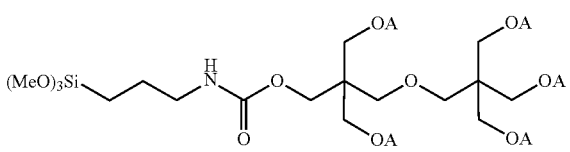

(C) Radical Polymerization Initiator (C-1) 2-Hydroxy-2-methyl-1-phenyl-propan-1-one

Example 1

100 Parts by mass of the (meth)acryloyl group-containing organopolysiloxane (A-1) obtained in Synthesis Example 1, 10 parts by mass of trimethylolpropane triacrylate (B-1) as component (B), and 5.0 parts by mass of 2-hydroxy-2-methyl-1-phenyl-propan-1-one (C-1) as the radical polymerization initiator (C) were uniformly mixed to obtain a radiation-curable organopolysiloxane composition.

Examples 2 to 10 and Comparative Examples 1 to 10

In Examples 2 to 10 and Comparative Examples 1 to 10, the components having the compositions shown in the following Table 1 were uniformly mixed as in Example 1 to obtain the radiation-curable organopolysiloxane compositions.

Releasability of release sheets formed from the radiation-curable organopolysiloxane compositions obtained in Examples 1 to 10 and Comparative Examples 1 to 10 were evaluated in accordance with the following methods.

[Determination of a Release Force of a Release Sheet]

The radiation-curable organopolysiloxane composition was applied by a roll on a PET film having a thickness of 38-μm at a coating weight of about 1.0 g/m$^2$ and exposed to ultraviolet rays at a dose of 100 mJ/cm$^2$ by two 80 W/cm high-pressure mercury lamps having an oxygen concentration set at 150 ppm to form a release sheet having a cured film. The release sheet thus formed was stored at 25° C. for 20 hours. Then, an acrylic adhesive tape TESA7475 (trade name) having a width of 25 mm was put on the surface of the cured film and pressure-bonded by moving a 2-Kg roller back and force once to prepare a test sample for evaluating a release force.

The test sample was aged at 70° C. for 20 to 24 hours while applying a load of 70 g/cm$^2$ thereto. Then, a force, N/25 mm, required for pulling and peeling the acrylic adhesive tape from the release sheet was determined at an angle of 180° and a release rate of 0.3 m/min by a tensile tester. The results are shown in Table 1.

[Residual Adhesion of Adhesive Tape]

The test sample for evaluating a release force was prepared according to the aforesaid manner. The test sample was aged at 70° C. for 20 to 24 hours while applying a load of 70 g/cm$^2$ thereto. Then, the acrylic adhesive tape was peeled off from the release sheet at an angle of 180° and a release rate of 0.3 m/min by a tensile tester. The resulting acrylic adhesive tape was put on a SUS plate. They were pressure-bonded by moving a 2-Kg roller back and force once and left to stand at 25° C. for 30 minutes. Then, a force (Y) required for releasing the adhesive tape from the SUS plate was determined. For comparison, a force (Z) required for releasing an acrylic adhesive tape TESA7475, which had not been bonded to the release sheet, from a SUS plate was determined. A residual adhesion was obtained by dividing Y by Z. The results are shown in Table 1.

[Adhesion Test of the Release Sheet]

The release sheet was prepared according to the aforesaid manner. The release sheet thus obtained was stored in a wet and heat dryer of 60° C. and 90% RH for 7 days. Then, the cured film was rubbed 10 times with a finger to check adhesion to the substrate. The cured film which was not cloudy and was not peeled off was evaluated as A. The cured film which was slightly cloudy and slightly peeled off was evaluated as B. The cured film which was peeled off from the substrate was evaluated as C. The results are shown in Table 1.

TABLE 1

| | Composition, part by mass | | | | | | | | | | | Result | | |
|---|---|---|---|---|---|---|---|---|---|---|---|---|---|---|
| | (Meth)acryl group-containing organopolysiloxane | | | | | | | Polyfunctional acrylate | | | Radical polymerization initiator | Release force, | Residual | |
| Hydroxyl group ratio | A-1 <0.001 | A-2 <0.001 | A-3 0.05 | A-4 0.10 | A-5 0.20 | D-1 0.45 | D-2 0.50 | B-1 | B-2 | B-3 | C-1 | N/25 mm) | adhesion, % | Adhesion |
| Example 1 | 100 | | | | | | | 10 | | | 5 | 0.15 | 9 | A |
| Example 2 | 100 | | | | | | | | 10 | | 5 | 0.15 | 99 | A |
| Example 3 | 100 | | | | | | | | | 10 | 5 | 0.16 | 99 | A |
| Example 4 | 90 | 10 | | | | | | | 10 | | 5 | 0.11 | 96 | A |
| Example 5 | | | 100 | | | | | | 10 | | 5 | 0.43 | 98 | A |
| Example 6 | | 20 | 80 | | | | | | 10 | | 5 | 0.14 | 97 | A |
| Example 7 | | | | 100 | | | | | 10 | | 5 | 0.45 | 99 | A |
| Example 8 | | 20 | | 80 | | | | | 10 | | 5 | 0.15 | 97 | A |
| Example 9 | | | | | 100 | | | | 10 | | 5 | 0.42 | 99 | A |
| Example 10 | | 20 | | | 80 | | | | 10 | | 5 | 0.14 | 96 | A |
| Com. Ex. 1 | 100 | | | | | | | | | | 5 | 0.11 | 98 | C |
| Com. Ex. 2 | | | 100 | | | | | | | | 5 | 0.41 | 99 | B |
| Com. Ex. 3 | | | | 100 | | | | | | | 5 | 0.44 | 97 | B |
| Com. Ex. 4 | | | | | 100 | | | | | | 5 | 0.43 | 98 | B |
| Com. Ex. 5 | | | | | | 100 | | | | | 5 | 0.57 | 92 | B |
| Com. Ex. 6 | | | | | | 100 | | | 10 | | 5 | 0.6 | 94 | B |
| Com. Ex. 7 | | 20 | | | | 80 | | | 10 | | 5 | 0.17 | 90 | C |
| Com. Ex. 8 | | | | | | | 100 | | | | 5 | 1.5 | 98 | B |
| Com. Ex. 9 | | | | | | | 100 | | 10 | | 5 | 1.53 | 99 | B |
| Com. Ex. 10 | | 20 | | | | | 80 | | 10 | | 5 | 0.12 | 97 | C |

As seen in Table 1, the release sheet obtained from the composition comprising the organopolysiloxane having the large amount of a hydroxyl group is inferior in light releasability, has poor adhesion to a substrate after stored under wet and heat conditions and, accordingly, is inferior in storage stability. In contrast, the release sheet having the cured product layer obtained from the radiation-curable organopolysiloxane composition of the present invention is released from the adhesive layer with a small force and is therefore excellent in easy releasability. In addition, the release sheet has high adhesion to a substrate and has long-term stability without showing reduced adhesion even after a storage under wet and heat conditions.

INDUSTRIAL APPLICABILITY

A cured product obtained from the radiation-curable organopolysiloxane composition of the present invention is released from an adhesive layer with a small force and, therefore, has easy releasability, high adhesion to a substrate and excellent storage stability. Therefore, the present radiation-curable organopolysiloxane composition is useful as a composition for a release sheet such as a release paper or a release film for various adhesive substances.

The invention claimed is:
1. A radiation-curable organopolysiloxane composition comprising the following components (A), (B) and (C):
(A) organopolysiloxane represented by the following formula (1):

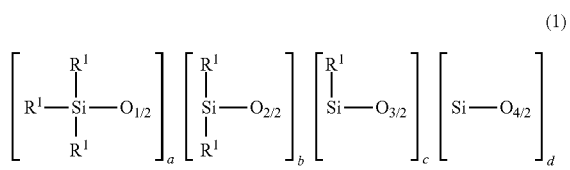

wherein $R^1$ is, independently of each other, a substituted or unsubstituted, monovalent hydrocarbon group having 1 to 10 carbon atoms, an alkoxy group having 1 to 5 carbon atoms, a hydroxyl group, a hydroxyl group-containing organic group, or a (meth)acryloyl group-containing organic group, with at least one of $R^1$ being a (meth)acryloyl group-containing organic group, a is an integer of 2 or more, b is an integer of 0 or more, c is an integer of 0 or more, d is an integer of 0 or more, a, b, c and d satisfy an equation, $2 \le a+b+c+d \le 1{,}000$, and a ratio of the total number of the hydroxyl group and the hydroxyl group-containing organic group to the total number of the (meth)acryloyl group-containing organic group, the hydroxyl group and the hydroxyl group-containing organic group is 0.0001 to 0.4;
(B) compound having two or more acrylic groups in one molecule in an amount of 0.1 to 50 parts by mass, relative to 100 parts by mass of component (A);
wherein component (B) is at least one selected from the group consisting of
an organosilane having two or more acrylic groups in one molecule optionally including a hydrolytic condensation product thereof; and
a compound having two or more acrylic groups in one molecule that is selected from the group consisting of 1,4-butanediol diacrylate, 1,6-hexanediol diacrylate, 1,9-nonanediol diacrylate, 1,10-decanediol diacrylate, tricyclodecanedimethanol diacrylate, dipropylene glycol diacrylate, tripropylene glycol diacrylate, trimethylolpropane triacrylate, pentaerythritol triacrylate, glycerinpropoxy triacrylate, pentaerythritol tetraacrylate, ditrimethylolpropane tetraacrylate, dipentaerythritol hexaacrylate, tripentaerythritol octaacrylate, propoxylated pentaerythritol tetraacrylate, and dipentaerythritol polyacrylate,
(C) radical polymerization initiator in an amount of 0.1 to 15 parts by mass, relative to 100 parts by mass of component (A); and
wherein the radiation-curable organopolysiloxane composition comprises no organopolysiloxane that is represented by the formula (1) and has a ratio of the total number of the hydroxyl group and the hydroxyl group-containing organic group to the total number of the (meth)acryloyl group-containing organic group, the hydroxyl group and the hydroxyl group-containing organic group being more than 0.4.

2. The radiation-curable organopolysiloxane composition according to claim 1, wherein component (B) is the organosilane having three or more acrylic groups in one molecule optionally including a hydrolytic condensation product thereof.

3. The radiation-curable organopolysiloxane composition according to claim 1, wherein component (B) is at least one selected from the group consisting of trimethylolpropane triacrylate, pentaerythritol triacrylate, glycerinpropoxy triacrylate, pentaerythritol tetraacrylate, ditrimethylolpropane tetraacrylate, dipentaerythritol hexaacrylate, tripentaerythritol octaacrylate, propoxylated pentaerythritol tetraacrylate, and dipentaerythritol polyacrylate.

4. The radiation-curable organopolysiloxane composition according to claim 1, wherein at least one of $R^1$ in the formula (1) is a hydroxyl group or a hydroxyl group-containing organic group and a ratio of the total number of the hydroxyl group and the hydroxyl group-containing organic group to the total number of the (meth)acryloyl group-containing organic group, the hydroxyl group and the hydroxyl group-containing organic group is 0.001 to 0.3.

5. The radiation-curable organopolysiloxane composition according to claim 1, wherein at least one of $R^1$ in the formula (1) is a hydroxyl group or a hydroxyl group-containing organic group and a ratio of the total number of the hydroxyl group and the hydroxyl group-containing organic group to the total number of the (meth)acryloyl group-containing organic group, the hydroxyl group and the hydroxyl group-containing organic group is 0.0001 to less than 0.001.

6. A cured product obtained by curing the radiation-curable organopolysiloxane composition according to claim 1.

7. A release sheet comprising a substrate and a layer of the cured product according to claim 6, wherein the layer of the cured product is laminated on at least one surface of the substrate.

8. The radiation-curable organopolysiloxane composition according to claim 2, wherein at least one of $R^1$ in the formula (1) is a hydroxyl group or a hydroxyl group-containing organic group and a ratio of the total number of the hydroxyl group and the hydroxyl group-containing organic group to the total number of the (meth)acryloyl group-containing organic group, the hydroxyl group and the hydroxyl group-containing organic group is 0.001 to 0.3.

9. The radiation-curable organopolysiloxane composition according to claim 3, wherein at least one of $R^1$ in the formula (1) is a hydroxyl group or a hydroxyl group-containing organic group and a ratio of the total number of the hydroxyl group and the hydroxyl group-containing organic group to the total number of the (meth)acryloyl group-containing organic group, the hydroxyl group and the hydroxyl group-containing organic group is 0.001 to 0.3.

10. The radiation-curable organopolysiloxane composition according to claim 2, wherein at least one of $R^1$ in the formula (1) is a hydroxyl group or a hydroxyl group-containing organic group and a ratio of the total number of the hydroxyl group and the hydroxyl group-containing organic group to the total number of the (meth)acryloyl group-containing organic group, the hydroxyl group and the hydroxyl group-containing organic group is 0.0001 to less than 0.001.

11. The radiation-curable organopolysiloxane composition according to claim 3, wherein at least one of $R^1$ in the formula (1) is a hydroxyl group or a hydroxyl group-containing organic group and a ratio of the total number of the hydroxyl group and the hydroxyl group-containing organic group to the total number of the (meth)acryloyl group-containing organic group, the hydroxyl group and the hydroxyl group-containing organic group is 0.0001 to less than 0.001.

12. A cured product obtained by curing the radiation-curable organopolysiloxane composition according to claim 2.

13. A cured product obtained by curing the radiation-curable organopolysiloxane composition according to claim 3.

14. A cured product obtained by curing the radiation-curable organopolysiloxane composition according to claim 4.

15. A cured product obtained by curing the radiation-curable organopolysiloxane composition according to claim 5.

* * * * *